US007765057B2

(12) United States Patent
Taguchi

(10) Patent No.: US 7,765,057 B2
(45) Date of Patent: Jul. 27, 2010

(54) DRIVING SCHEDULE CREATING DEVICE

(75) Inventor: Koji Taguchi, Isehara (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 213 days.

(21) Appl. No.: 12/185,228

(22) Filed: Aug. 4, 2008

(65) Prior Publication Data

US 2009/0048768 A1 Feb. 19, 2009

(30) Foreign Application Priority Data

Aug. 8, 2007 (JP) ............................ 2007-206883

(51) Int. Cl.
*G06F 19/00* (2006.01)

(52) U.S. Cl. ........................ 701/117; 701/301; 340/435

(58) Field of Classification Search ................. 701/117, 701/301; 340/435
See application file for complete search history.

(56) References Cited

U.S. PATENT DOCUMENTS

2005/0231340 A1* 10/2005 Tauchi ........................ 340/435
2006/0181431 A1* 8/2006 Konishi et al. .............. 340/903
2006/0192687 A1* 8/2006 Konishi et al. .............. 340/901
2007/0021904 A1* 1/2007 Kawamata et al. .......... 701/200
2007/0165910 A1* 7/2007 Nagaoka et al. ............. 382/104

FOREIGN PATENT DOCUMENTS

JP A-2004-170283 6/2004
JP A-2005-115637 4/2005
JP A-2008-225583 9/2008

* cited by examiner

*Primary Examiner*—Mark Hellner
*Assistant Examiner*—Helal A Algahaim
(74) *Attorney, Agent, or Firm*—Oliff & Berridge, PLC

(57) ABSTRACT

A redundancy computing part 22 computes a redundancy between respective detectable regions D of perimeter monitoring sensors 10 mounted in a plurality of vehicles, while a driving schedule creating part 26 creates such a driving schedule as to lower the redundancy between detectable regions D computed by the redundancy computing part 22, thus making it possible to create a driving schedule which reduces parts where the respective detectable regions D of the perimeter monitoring sensors 10 of the vehicles overlap, thereby increasing areas where obstacles can directly be detected by the perimeter monitoring sensors 10 of the vehicles.

8 Claims, 11 Drawing Sheets

DRIVING SCHEDULE CREATING DEVICE

BACKGROUND OF THE INVENTION

1. Field of the Invention

The present invention relates to a driving schedule creating device and, in particular, to a driving schedule creating device which creates driving schedules of a plurality of vehicles each mounted with an onboard sensor for detecting obstacles existing thereabout.

2. Related Background Art

A technique for detecting the position of a vehicle running about the own vehicle and reporting it to a user has conventionally been disclosed in Japanese Patent Application Laid-Open No. 2005-115637. In this technique, not only front vehicle information obtained by a radar device mounted in the own vehicle, but also vehicle information obtained by a radar device mounted in the other vehicle running about the own vehicle and position information of the other vehicle are acquired through an inter-vehicle communication device, and the vehicle position indicated by the front vehicle information and communication vehicle information obtained by the inter-vehicle communication device is mapped in a mapping area, so as to specify the vehicle position.

SUMMARY OF THE INVENTION

Since the radar device mounted in the own vehicle cannot cover all the directions by itself, the above-mentioned technique also uses the communication vehicle information obtained by the inter-vehicle communication device, so as to complement information on the outside of the region detectable by the radar device of the own vehicle. Since the radar device mounted in the other vehicle also leaves an undetectable region, however, there is a fear that vehicles undetected by any of the radar devices of the own and other vehicles may exist about the own vehicle in the above-mentioned technique.

For overcoming the problem mentioned above, it is an object of the present invention to provide a driving schedule creating device which can improve the accuracy in estimating the existence of obstacles for a plurality of vehicles each mounted with an onboard sensor for detecting the obstacles existing thereabout.

The present invention provides a driving schedule creating device for creating a driving schedule of a vehicle mounted with an onboard sensor for detecting an obstacle existing thereabout; the device comprising an onboard sensor detection region acquiring unit for acquiring onboard sensor detectable regions as detectable regions of respective onboard sensors mounted in a plurality of vehicles, and a driving schedule creating unit for creating the driving schedule of the vehicle according to the respective onboard sensor detectable regions of the onboard sensors mounted in the plurality of vehicles acquired by the onboard sensor detection region acquiring unit.

In this structure, the onboard sensor detection region acquiring unit acquires onboard sensor detectable regions which are respective detectable regions of the onboard sensors mounted in a plurality of vehicles, while the driving schedule creating unit creates a driving schedule of a vehicle according to the respective onboard sensor detectable regions of the onboard sensors mounted in the plurality of vehicles acquired by the onboard sensor detection region acquiring unit, whereby the vehicle runs according to the onboard sensor detectable regions of the respective onboard sensors mounted in the vehicles, thus making it possible to improve the accuracy in estimating the existence of obstacles.

Preferably, in this case, the device further comprises a temporary driving schedule creating unit for creating a temporary driving schedule of the vehicle, the driving schedule creating unit evaluates according to the onboard sensor detectable regions of the respective onboard sensors mounted in the vehicles acquired by the onboard sensor detection region acquiring unit the temporary driving schedule created by the temporary driving schedule creating unit and employs the temporary driving schedule whose result of evaluation satisfies a predetermined standard as the driving schedule.

In this structure, since the temporary driving schedule creating unit creates a temporary driving schedule of the vehicle and, according to the onboard sensor detectable regions of the respective onboard sensors mounted in the vehicles acquired by the onboard sensor detection region acquiring unit, the driving schedule creating unit evaluates the temporary driving schedule created by the temporary driving schedule creating unit and employs the temporary driving schedule whose result of evaluation satisfies a predetermined standard as the driving schedule, the driving schedule creating unit employs a favorable driving schedule satisfying an evaluation standard corresponding to the onboard sensor detectable regions, thereby making it possible to further improve the accuracy in estimating the existence of obstacles.

Preferably, in this case, the temporary driving schedule satisfying the standard is a temporary driving schedule by which the onboard sensor detectable region or a region where the existence of an obstacle is estimatable according to information from the onboard sensor detectable region is made greater than that in another temporary driving schedule.

In this structure, as the driving schedule, the driving schedule creating unit employs the temporary driving schedule by which the onboard sensor detectable region or a region where the existence of an obstacle is estimatable according to information from the onboard sensor detectable region is made greater, thus making it more possible for the onboard sensor to detect obstacles directly or indirectly, whereby the accuracy in estimating the existence of obstacles can be improved.

On the other hand, it will be preferred if the device further comprises a redundancy computing unit for computing a redundancy between the respective onboard sensor detectable regions of the onboard sensors mounted in the plurality of vehicles, while the driving schedule creating unit creates the driving schedule of the vehicle according to the redundancy between the onboard sensor detectable regions computed by the redundancy computing unit.

In this structure, the redundancy computing unit computes the redundancy between the respective onboard sensor detectable regions of the onboard sensors mounted in the plurality of vehicles, while the driving schedule creating unit creates the driving schedule of the vehicle according to the redundancy between the onboard sensor detectable regions computed by the redundancy computing unit, whereby the vehicle can run according to the redundancy between the onboard sensor detectable regions.

Preferably, in this case, the driving schedule creating unit creates such a driving schedule as to lower the redundancy between the onboard sensor detectable regions computed by the redundancy computing unit.

In this structure, the driving schedule creating unit creates such a driving schedule as to lower the redundancy between the onboard sensor detectable regions computed by the redundancy computing unit, thus making it possible to create a driving schedule which reduces overlapping parts between the respective onboard sensor detectable regions of the onboard sensors in the vehicles, thereby increasing regions where obstacles can directly be detected by the respective onboard sensors of the vehicles.

On the other hand, it will be preferred if the device further comprises an open region acquiring unit for acquiring an open region undefined by any of the respective onboard sensor detectable regions of the onboard sensors mounted in the plurality of vehicles and undrivable regions where the vehicles are undrivable, while the driving schedule creating unit creates such a driving schedule that at least a part of the open region becomes a closed region defined by any of the respective onboard sensor detectable regions of the onboard sensors mounted in the plurality of vehicles and undrivable regions where the vehicles are undrivable.

In this structure, the open region acquiring unit acquires an open region undefined by any of the respective onboard sensor detectable regions of the onboard sensors mounted in the plurality of vehicles and undrivable regions where the vehicles are undrivable, while the driving schedule creating unit creates such a driving schedule that at least a part of the open region becomes a closed region defined by any of the respective onboard sensor detectable regions of the onboard sensors mounted in the plurality of vehicles and undrivable regions where the vehicles are undrivable, thus making it possible to create a driving schedule which reduces open regions where the existence of obstacles is not estimatable and turns them into closed regions where the existence of obstacles is estimatable, thereby increasing the regions where the existence of obstacles is estimatable.

Preferably, the device further comprises an onboard sensor utilization estimating unit for estimating an obstacle existing in a closed region defined by any of the respective onboard sensor detectable regions of the onboard sensors mounted in the plurality of vehicles and undrivable regions where the vehicles are undrivable, and an onboard sensor utilization estimation error acquiring unit for acquiring an estimation error in the estimation effected by the onboard sensor utilization estimating unit, while the driving schedule creating unit creates the driving schedule of the vehicle according to the estimation error acquired by the onboard sensor utilization estimation error acquiring unit.

In this structure, the onboard sensor utilization estimating unit estimates obstacles existing in a closed region defined by any of the respective onboard sensor detectable regions of the onboard sensors mounted in the plurality of vehicles and undrivable regions where the vehicles are undrivable, the onboard sensor utilization estimation error acquiring unit acquires the estimation error in the estimation effected by the onboard sensor utilization estimating unit, and the driving schedule creating unit creates a driving schedule of the vehicle according to the estimation error acquired by the onboard sensor utilization estimation error acquiring unit, whereby a driving schedule taking account of the error in estimating the existence of obstacles can be created.

Preferably, in this case, the driving schedule creating unit creates such a driving schedule as to reduce the estimation error acquired by the onboard sensor utilization estimation error acquiring unit.

In this structure, the driving schedule creating unit creates such a driving schedule as to reduce the estimation error acquired by the onboard sensor utilization estimation error acquiring unit, thus making it possible to create a driving schedule taking account of the error in estimating the existence of obstacles by the onboard sensors, whereby the accuracy in estimating the existence of obstacles can be improved.

Preferably, the device further comprises a road sensor detection region acquiring unit for acquiring a road sensor detectable region as a detectable region of a road sensor for detecting an obstacle existing on a road where the vehicle runs, while the driving schedule creating unit creates the driving schedule of the vehicle according to the road sensor detectable region acquired by the road sensor detection region acquiring unit.

In this structure, the road sensor detection region acquiring unit acquires a road sensor detectable region as a detectable region of a road sensor for detecting an obstacle existing on a road where the vehicle runs, while the driving schedule creating unit creates a driving schedule of the vehicle according to the road sensor detectable region acquired by the road sensor detection region acquiring unit, whereby a driving schedule which also takes account of the detectable region of the road sensor can be created.

Preferably, in this case, the device further comprises a road sensor utilization estimating unit for estimating an obstacle existing in a closed region defined by any of the respective onboard sensor detectable regions of the onboard sensors mounted in the plurality of vehicles, the detectable region of the road sensor, and undrivable regions where the vehicles are undrivable, and a road sensor utilization estimation error acquiring unit for acquiring an estimation error in the estimation effected by the road sensor utilization estimating unit, while the driving schedule creating unit creates such a driving schedule as to reduce the estimation error acquired by the road sensor utilization estimation error acquiring unit.

In this structure, the road sensor utilization estimating unit estimates an obstacle existing in a closed region defined by any of the respective onboard sensor detectable regions of the onboard sensors mounted in the plurality of vehicles, the detectable region of the road sensor, and undrivable regions where the vehicles are undrivable, the road sensor utilization estimation error acquiring unit acquires the estimation error in the estimation effected by the road sensor utilization estimating unit, and the driving schedule creating unit creates such a driving schedule as to reduce the estimation error acquired by the road sensor utilization estimation error acquiring unit, thus making it possible to create a driving schedule taking account of the estimation error caused by the road sensor concerning the existence of obstacles, whereby the accuracy in estimating the existence of obstacles can be improved.

The driving schedule creating device of the present invention can improve the accuracy in estimating the existence of obstacles for a plurality of vehicles each mounted with an onboard sensor for detecting the obstacles existing thereabout.

DESCRIPTION OF THE PREFERRED EMBODIMENTS

Figure 1:
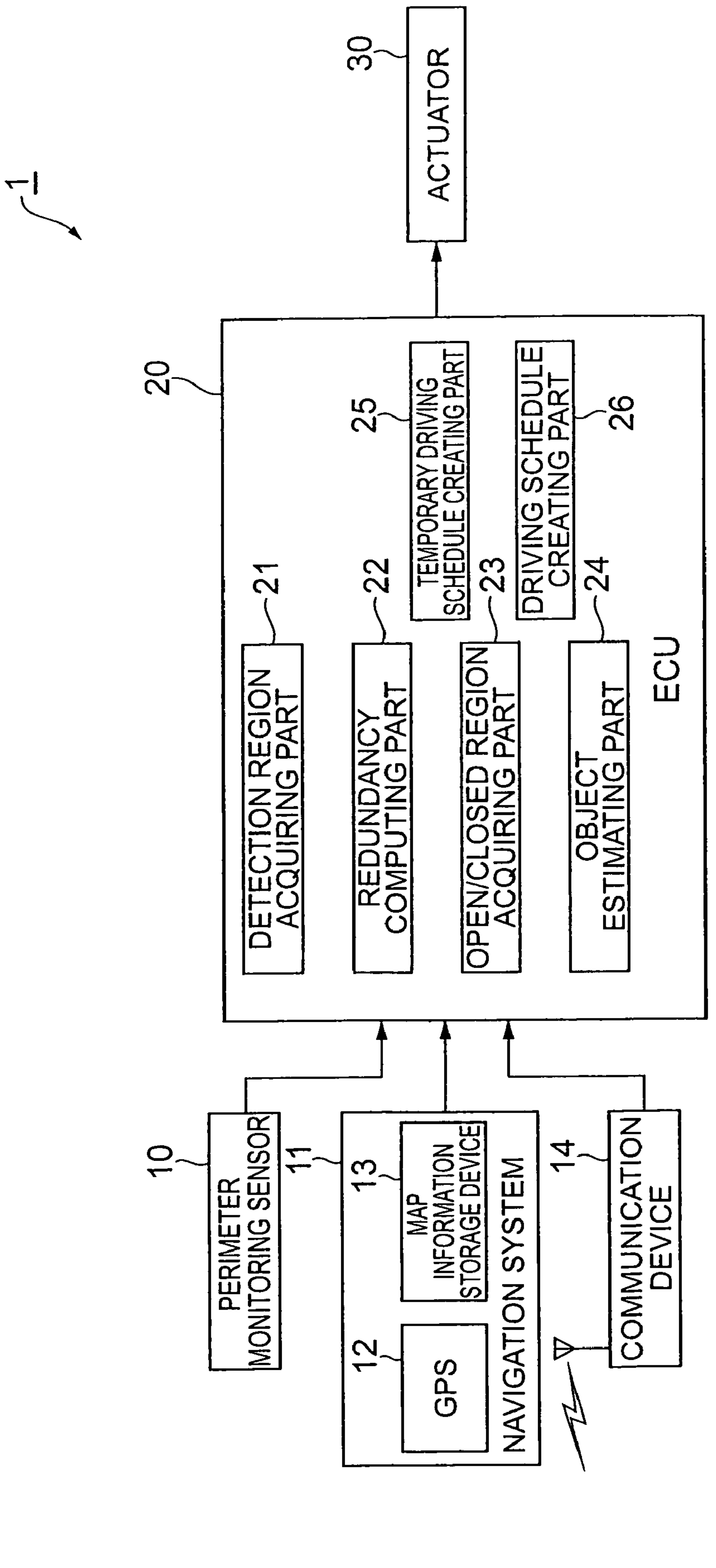
FIG. 1 is a block diagram showing the structure of the driving schedule creating device in accordance with an embodiment.

In the following, the driving schedule creating device in accordance with an embodiment of the present invention will be explained with reference to the accompanying drawings. FIG. 1 is a block diagram showing the structure of the driving schedule creating device in accordance with the embodiment. The driving schedule creating device 1 is a device which is mounted in each of vehicles forming a vehicle group, directly detects obstacles such as other vehicles existing within a detectable region of a perimeter monitoring sensor 10, estimates the existence of other vehicles about the own vehicle which are undetectable by the perimeter monitoring sensor 10, and creates a driving schedule of each vehicle.

Therefore, the driving schedule creating device 1 comprises the perimeter monitoring sensor 10 for detecting other vehicles and the like existing about the own vehicle; a car navigation system 11 for acquiring road information, position information of the own vehicle, and the like; a communication device 14 for exchanging information by wireless communication between the own vehicle and the other vehicles forming a vehicle group, while acquiring information from a road infrastructure sensor; an electronic control unit (hereinafter referred to as "ECU") 20 for detecting and estimating a driving environment about each of the vehicles constituting the vehicle group according to information fed from the perimeter monitoring sensor 10, car navigation system 11, and communication device 14, and creating a driving schedule of each vehicle; an actuator 30 for causing each of the devices of the vehicle to act according to an instruction from the ECU 20, so as to drive the vehicle in conformity to the driving schedule; and the like.

The perimeter monitoring sensor 10 detects obstacles such as the other vehicles existing about the own vehicle. Thus, the perimeter monitoring sensor 10 functions as an onboard sensor recited in the claims. This embodiment is constructed such that four perimeter monitoring sensors 10 are arranged in the front, rear, and left and right sides of the vehicle, so as to detect the other vehicles existing in the front, rear, and left and right sides of the vehicle. However, it is not possible for the four perimeter monitoring sensors 10 to cover the whole periphery of the own vehicle, whereby a region outside of the respective detectable regions (onboard sensor detectable regions) of the perimeter monitoring sensors 10, i.e., undetectable region, remains about the own vehicle. Preferably employable as the perimeter monitoring sensors 10 are image sensors such as millimeter-wave radars, laser radars, and stereo cameras and ultrasonic sensors. Different sensors may be used in combination. The perimeter monitoring sensor 10 and ECU 20 are connected to each other through a communication line such as CAN (Controller Area Network), for example, so as to be able to exchange data therebetween, whereby whether the other vehicles exist or not, position information of the other vehicles, and the like are outputted to the ECU 20 through this communication line.

Here, the millimeter-wave radars and laser radars irradiate the front side of the vehicle with a detection wave such as an electric wave in the millimeter waveband or laser light while horizontally scanning it, and receive waves reflected by surfaces of obstacles such as the other vehicles, so as to detect distances, relative speeds, and directions with respect to the other vehicles. The direction, distance, and speed of the other vehicle are detected by utilizing the angle of the reflected wave, the time elapsed from the emission of the electric wave until its return, and the change in frequency (Doppler effect) of the reflected wave, respectively.

The stereo camera, which has a pair of CCD cameras for acquiring images of obstacles such as the other vehicles and an image processing part for detecting the other vehicles by image recognition from the acquired images, extracts the other vehicles by edge extraction, pattern recognition processing, and the like from within the images captured by the CCD cameras. The distance to the other vehicle and its lateral displacement from the own vehicle are determined by triangulation according to the difference between obstacle positions in the left and right images acquired, while the relative speed is determined from the amount of change from the distance determined in the previous frame.

The car navigation system 11 detects the own vehicle position according to a GPS satellite signal received by a GPS (Global Positioning System) 12. The driving distance is computed according to a vehicle speed signal, while the vehicle advancing direction is detected in response to a signal from a gyro sensor. From a map information storage device 13 such as built-in HDD or DVD, the car navigation system 11 acquires not only road information such as the lane structure or curvature of the road where the own vehicle is running, but also information concerning undrivable regions where the vehicles are undrivable existing about the road where the own vehicle is running. The car navigation system 11 is also connected to the ECU 20, whereby the acquired own vehicle position information, road information, undrivable regions, and the like are fed to the ECU 20.

The communication device 14 allows the own vehicle and other vehicles to mutually exchange information such as detection results by the perimeter monitoring sensor 10 and detectable regions. From a road infrastructure sensor placed in a side strip or the like, the communication device acquires information such as detection results by the road infrastructure sensor and detectable regions. The communication device 14 has a receiver for receiving the detection results, detectable region information, and the like of the perimeter monitoring sensors mounted in the other vehicles transmitted from the other vehicles, the detection results and detectable region information of the road infrastructure sensor, and the like, and a transmitter for transmitting the detection results and detectable region information of the perimeter monitoring sensor 10 mounted in the own vehicle and the like to the other vehicles.

The communication device 14 and the ECU 20 are also connected to each other through the above-mentioned communication line, so as to be able to exchange data mutually therebetween. The detection results, detectable region information, and the like of the perimeter monitoring sensors mounted in the other vehicles received by the communication device 14 are transferred to the ECU 20 through the communication line. The detection results and detectable region information of the perimeter monitoring sensor 10 mounted in the own vehicle and the like are transferred to the communication device 14 through the communication line.

In terms of hardware, the ECU 20 is constituted by a microprocessor for performing arithmetic operations, a ROM storing programs and the like for causing the microprocessor to execute processes, a RAM for storing various kinds of data such as results of arithmetic operations, a backup RAM whose memory is kept by a battery of 12 V, and the like.

As shown in FIG. 1, the ECU 20 has a detection region acquiring part 21, a redundancy computing part 22, an open/closed region acquiring part 23, an object estimating part 24, a temporary driving schedule creating part 25, and a driving schedule creating part 26 as a functional block to be executed by the programs.

The detection region acquiring part 21 is used for acquiring respective detectable regions of perimeter monitoring sensors mounted in a plurality of vehicles. The detection region acquiring part 21 is also used for acquiring the detectable region of the road infrastructure sensor. Thus, the detection region acquiring part 21 functions as the onboard sensor detection region acquiring unit and road sensor detection region acquiring unit recited in the claims.

The redundancy computing part 22 is used for computing the redundancy between the respective detectable regions of the perimeter monitoring sensors 10 mounted in a plurality of vehicles forming a vehicle group. Thus, it functions as the redundancy computing unit recited in the claims.

The open/closed region acquiring part 23 is used for acquiring an open region which is undefined by any of the respective detectable regions of the perimeter monitoring sensors 10 mounted in the plurality of vehicles forming the vehicle group, the detectable region of the road infrastructure sensor, and the undrivable regions where the vehicles are undrivable. The open/closed region acquiring part 23 is also used for acquiring a closed region which is defined by any of the respective detectable regions of the perimeter monitoring sensors 10 mounted in the plurality of vehicles forming the vehicle group, the detectable region of the road infrastructure sensor, and the undrivable regions where the vehicles are undrivable. Thus, the open/closed region acquiring part 23 functions as the open region acquiring unit recited in the claims.

The object estimating part 24 is used for estimating obstacles existing in a closed region which is defined by any of the respective detectable regions of the perimeter monitoring sensors 10 mounted in the plurality of vehicles, the detectable region of the road infrastructure sensor, and the undrivable regions where the vehicles are undrivable. Thus, the object estimating part 24 functions as the onboard utilization estimating unit and road sensor utilization estimating unit recited in the claims.

The object estimating part 24 not only estimates obstacles existing in the closed region, but also acquires an estimation error in the estimation. Therefore, the object estimating part 24 functions as the onboard sensor utilization estimating unit and road sensor utilization estimating unit recited in the claims.

The temporary driving schedule creating part 25 is used for creating a temporary driving schedule of each of the plurality of vehicles. Thus, the temporary driving schedule creating part 25 functions as the temporary driving schedule creating unit recited in the claims.

The driving schedule creating part 26 is used for creating a driving schedule of each of the plurality of vehicles according to the respective detectable regions of the perimeter monitoring sensors 10 and the detectable region of the road infrastructure sensor. Specifically, from the temporary driving schedules created by the temporary driving schedule creating part 25, the driving schedule creating part 26 creates a driving plan by employing such a temporary driving schedule as to increase the detectable regions of the perimeter monitoring sensors 10 and road infrastructure sensor or the closed region defined by any of the detectable regions of the perimeter monitoring sensors 10 and road infrastructure sensor and the undrivable regions. Thus, the driving schedule creating part 26 functions as the driving schedule creating unit recited in the claims.

The actuator 30, specific examples of which include accelerator actuators for adjusting the degree of throttle opening, brake actuators for adjusting the amount of braking, and steering actuators for driving steering, is used for driving the vehicle in conformity to the driving schedule created by the driving schedule creating part 26.

In the following, actions of the driving schedule creating device in accordance with this embodiment will be explained.

Figure 2:
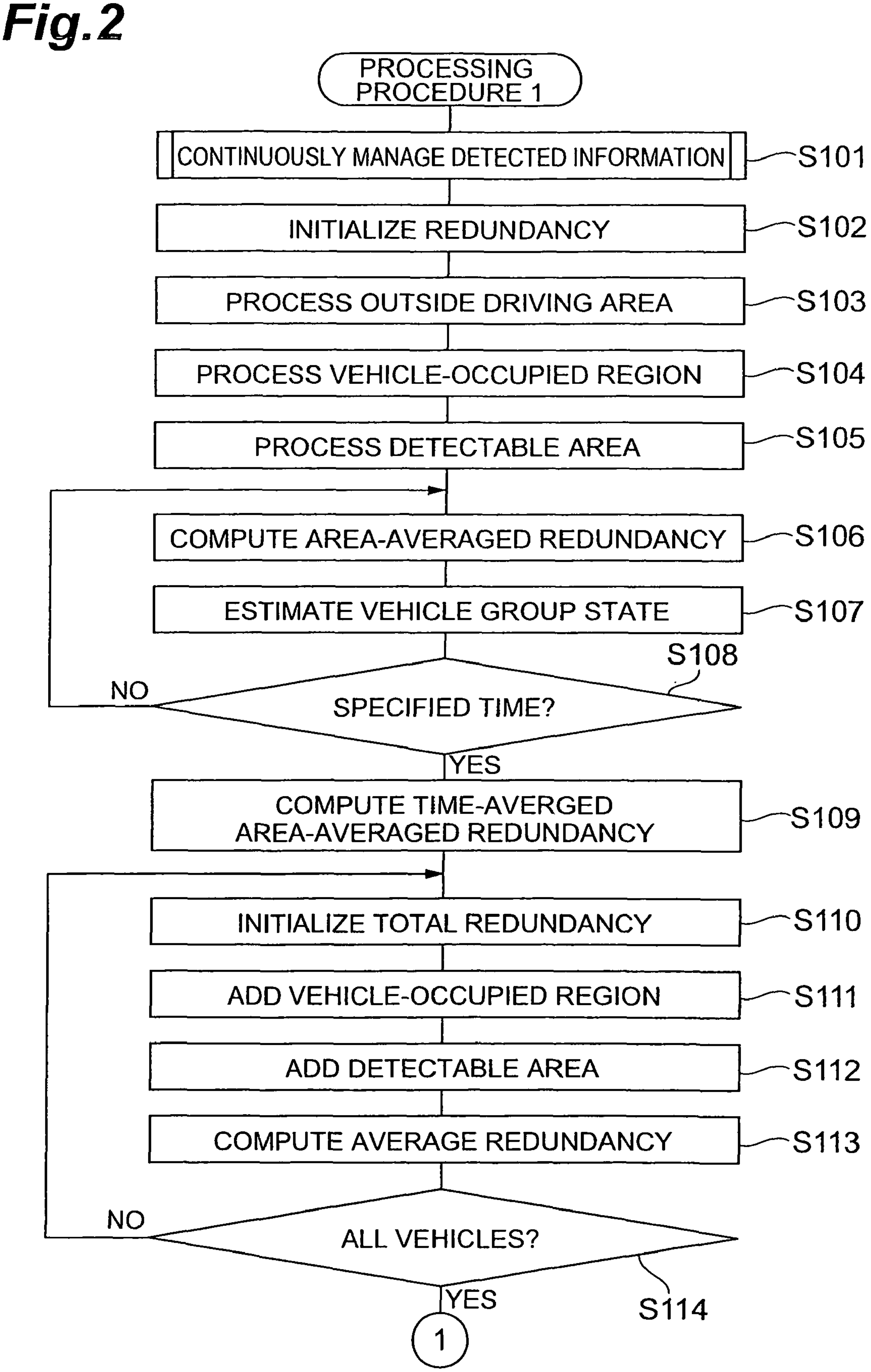
FIG. 2 is a flowchart showing actions at the time of lowering the redundancy between detectable regions by the driving schedule creating apparatus in accordance with the embodiment.
Figure 3:
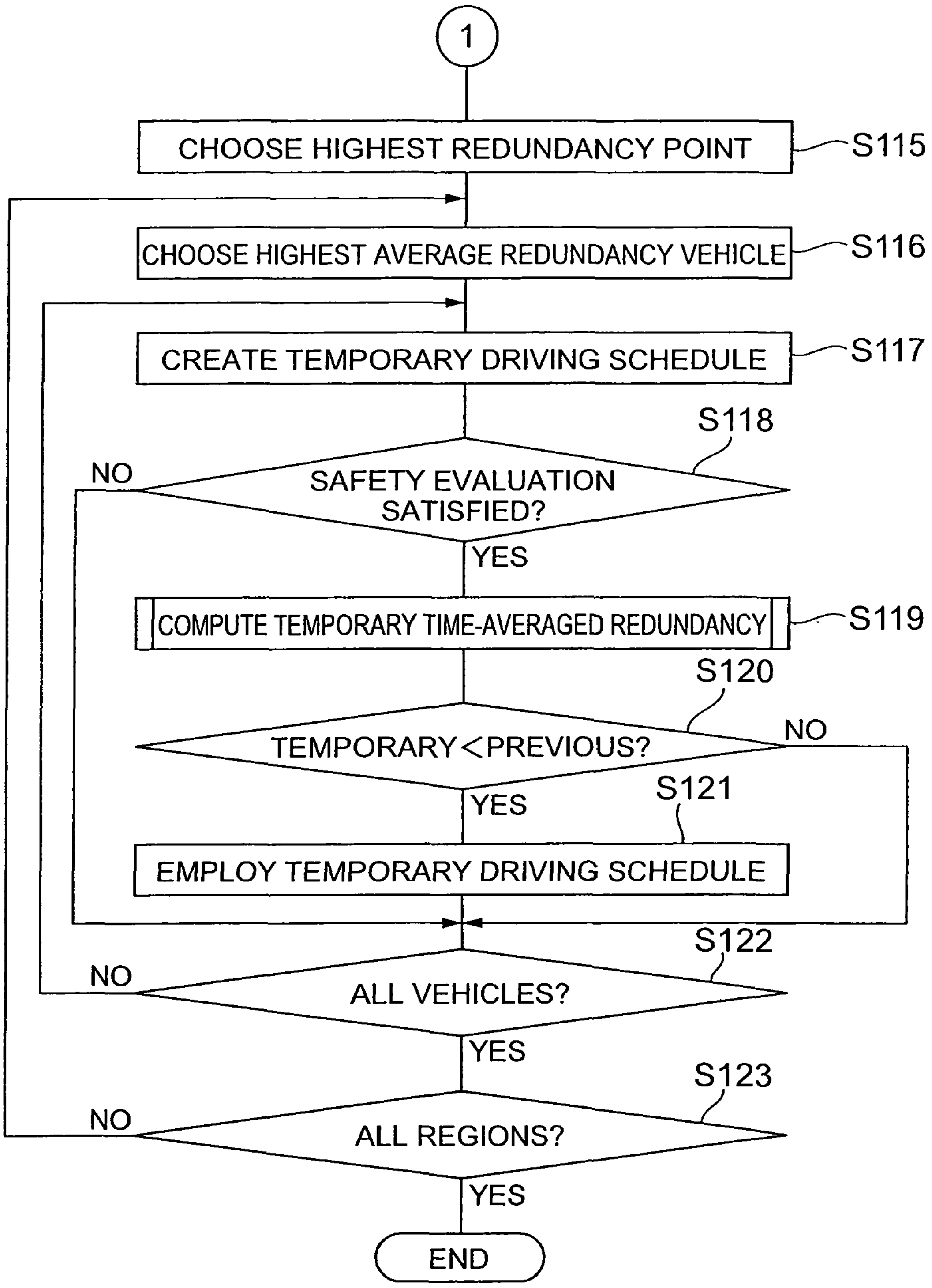
FIG. 3 is a flowchart showing actions at the time of lowering the redundancy between detectable regions by the driving schedule creating apparatus in accordance with the embodiment.

Processing procedure 1: Actions at the Time of Lowering the Redundancy Between Detectable Regions Actions at the time of lowering the redundancy between detectable regions in the driving schedule creating device in accordance with this embodiment will now be explained. FIGS. 2 and 3 are flowcharts showing the actions at the time of lowering the redundancy between detectable regions in the driving schedule creating device in accordance with this embodiment. The processes in the processing procedures 1 to 4 to be explained in the following are repeatedly executed at predetermined timings by the ECU 20 from power-on until power-off.

Figure 4:
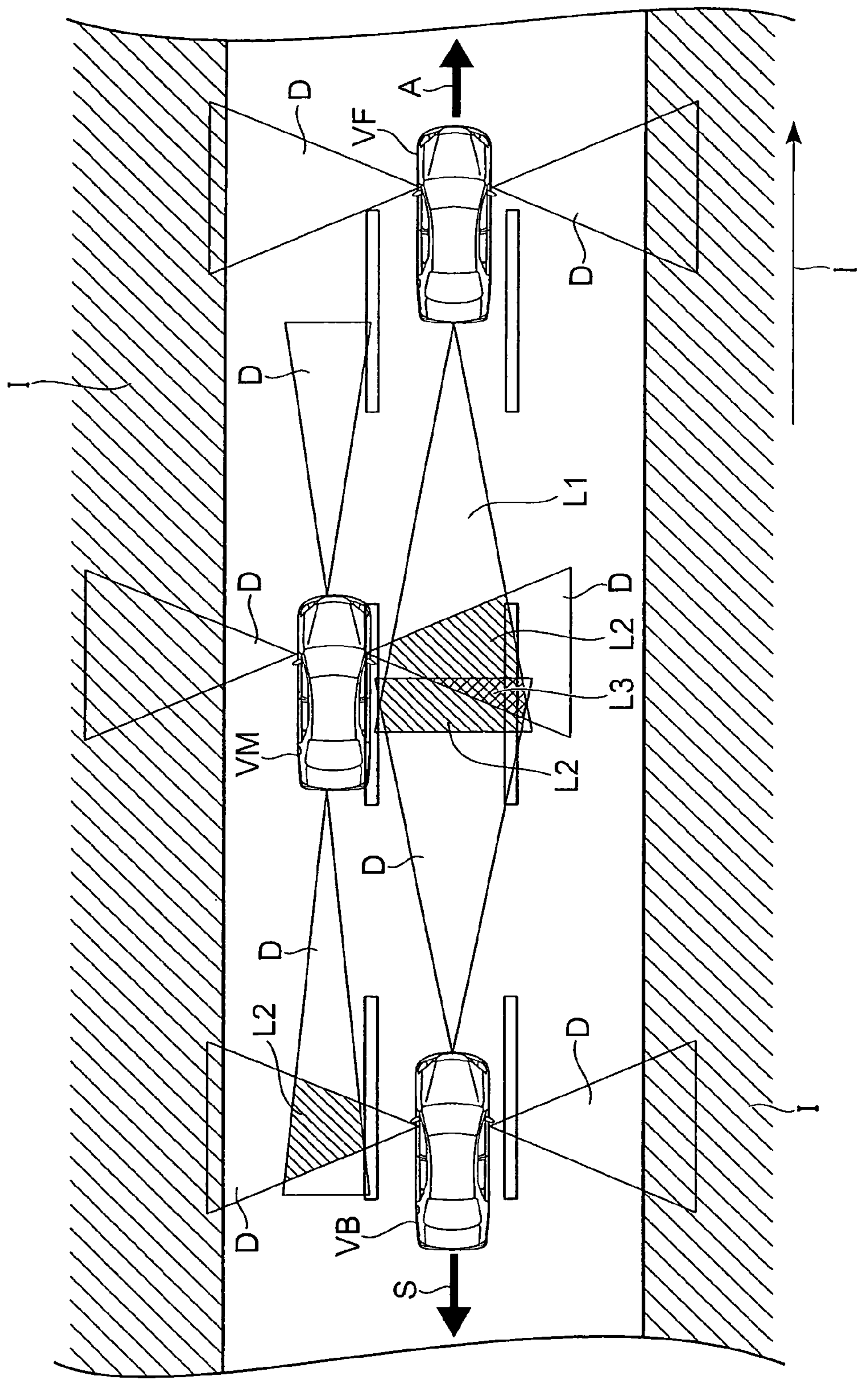
FIG. 4 is a plan view showing actions at the time of lowering the redundancy between detectable regions by the driving schedule creating apparatus in accordance with the embodiment.

FIG. 4 is a plan view showing the actions at the time of lowering the redundancy between detectable regions by the driving schedule creating device in accordance with this embodiment. As shown in FIG. 4, a leading vehicle VF, a following vehicle VM, and a trailing vehicle VB, each mounted with the driving schedule creating device 1 in accordance with this embodiment comprising the perimeter monitoring sensor 10 and the like, run as a vehicle group along an advancing direction 1 on a road having undrivable regions I where the vehicles are undrivable on both sides. As a representative of the vehicle group, one of the driving schedule creating devices 1 mounted in the leading vehicle VF, following vehicle VM, and trailing vehicle VB creates the following driving schedule according to the detection results of the perimeter monitoring sensors 10 of the other vehicles and the like.

As a prerequisite, information detected by the perimeter monitoring sensors 10 of the leading vehicle VF, following vehicle VM, and trailing vehicle VB is continuously managed by the following process (S101). A detection/estimation object map such as the one shown in FIG. 4 is secured within a memory of the ECU 20 (or its peripheral device). Specifically, an area of 50 m in width and 200 m in length (2 Mbytes) constructed by a 10-cm square unit area (100 $cm^2$) per capacity (e.g., 2 bytes) is arranged on the memory. Each time when information such as that a unit area is a drivable region, a region occupied by a vehicle, a detectable region of the perimeter monitoring sensor 10, or the like is acquired, a number incremented by 1 is written in the unit area.

According to the road information acquired from the navigation system 11, the drivable regions where the vehicles are drivable and the undrivable regions I where the vehicles are undrivable are arranged on the detection/estimation object map as numbers are written in the unit areas one by one. The positions of the leading vehicle VF, following vehicle VM, and trailing vehicle VB capable of inter-vehicle communication are acquired through the inter-vehicle communication, whereby the regions occupied by these vehicles are arranged on the detection/estimation object map as numbers are written in the unit areas one by one. Detectable regions D of the perimeter monitoring sensors 10 of the leading vehicle VF, following vehicle VM, and trailing vehicle VB and regions occupied by obstacles directly detected within the detectable regions D, such as other vehicles not belonging to the vehicle group, are arranged on the detection/estimation object map as numbers are written in the unit areas one by one.

When an undetectable closed region defined by the detectable region of the perimeter monitoring sensor 10 mounted in the other vehicle received by the communication device 14, the detectable region of the perimeter monitoring sensor 10 mounted in the own vehicle, and the undrivable region I is formed in this embodiment, incomings and outgoings of vehicles with respect to the undetectable closed region are continuously managed, whereby the number of vehicles within the undetectable closed region, which cannot directly be detected by the perimeter monitoring sensors 10, is continuously estimated.

According to the following procedure, a redundancy distribution in the detectable regions D of the perimeter monitoring sensors 10 is determined. As shown in FIG. 2, the redundancy computing part 22 once resets the above-mentioned detection/estimation object map, so that all the numbers written in the unit areas in the area of 50 m in width and 200 m in length constructed by a 10-cm square unit area per 2 bytes are turned into 0 (S102).

The redundancy computing part 22 acquires a drivable region about the vehicle group according to the road information obtained from the navigation system 11, and increments the number in each of the unit areas belonging to the drivable region by 1, so as to arrange the drivable region in the detection/estimation object map (S103).

As the positions of the leading vehicle VF, following vehicle VM, and trailing vehicle VB are acquired through the inter-vehicle communication by the communication device 14, and the respective numbers in the unit areas belonging to the regions occupied by these vehicles are incremented by 1, the redundancy computing part 22 arranges the respective regions occupied by the vehicles in the detection/estimation object map (S104).

As the detectable regions D of the respective perimeter monitoring sensors 10 of the leading vehicle VF, following vehicle VM, and trailing vehicle VB are acquired through the inter-vehicle communication by the communication device 14, and the respective numbers in the unit areas belonging to the detectable regions D are incremented by 1, the redundancy computing part 22 arranges the detectable regions D in the detection/estimation object map (S105). As a consequence, a number corresponding to the amount of information acquired is written in each unit area, whereby the redundancy distribution (distribution of redundancy in information) in the detection/estimation object map is determined. Assuming that a region where the respective detectable regions D of the leading vehicle VF, following vehicle VM, and trailing vehicle VB do not overlap the other detectable regions D has a redundancy L1 in the example of FIG. 4, regions having a redundancy L2 where the detectable regions D overlap doubly exist on the right and rear sides of the following vehicle VM, while a region having a redundancy L3 where the detectable regions D overlap triply exists on the right side of the following vehicle VM.

According to the following procedure, a time-averaged redundancy is determined. The redundancy computing part 22 averages all the numbers written in the respective unit areas in the redundancy distribution in the detection/estimation object map determined by steps S101 to S105, so as to yield an area-averaged redundancy (S106).

According to the driving schedules created by the respective driving schedule creating parts 26 of the driving schedule creating devices 1 in the leading vehicle VF, following vehicle VM, and trailing vehicle VB, the respective actions of the vehicles detected by the perimeter monitoring sensors 10, and the like, the redundancy computing part 22 estimates the state of each of the vehicles constituting the vehicle group after the lapse of a predetermined time (e.g., 1 sec) (S107).

Up to a specified time (e.g., 10 sec), the redundancy computing part 22 determines the area-averaged redundancy at intervals of a unit time for the estimated state of each vehicle after the lapse of the unit time as mentioned above (S106 to S108). The redundancy computing part 22 determines an average of all the area-averaged redundancies on the time axis up to the specified time, thereby yielding a time-averaged redundancy (S109).

According to the following procedure, the respective average redundancies of the leading vehicle VF, following vehicle VM, and trailing vehicle VB forming the vehicle group are determined. First, the redundancy computing part 22 initializes the total redundancy value indicative of the total amount of information per vehicle to 0 (S110). For one vehicle, the redundancy computing part 22 adds all the redundancy distribution values determined in steps S101 to S105 in the region occupied by the vehicle to its total redundancy value (S111). The redundancy computing part 22 adds all the redundancy distribution values determined in steps S101 to S105 in the detectable region D of the perimeter monitoring sensor 10 mounted in the vehicle to its total redundancy value (S112). The redundancy computing part 22 divides the total redundancy value by the area of the region occupied by the vehicle and the detectable region D, so as to determine an average redundancy value (S113). The redundancy computing part 22 performs the processes of steps S110 to S113 for all of the leading vehicle VF, following vehicle VM, and trailing vehicle VB forming the vehicle group (S114).

As shown in FIG. 3, the driving schedule creating device 1 performs the following process in the regions successively in descending order of their redundancy distributions determined in the foregoing, so as to create such a driving schedule as to lower the redundancy in the whole detection/estimation object map.

The temporary driving schedule creating part 25 determines the highest redundancy point that is a region having the highest redundancy in all the regions within the detection/estimation object map (S115). In the example of FIG. 4, a point on the right side of the following vehicle VM yielding the redundancy L3 becomes the highest redundancy point. Among the leading vehicle VF, following vehicle VM, and trailing vehicle VB including the highest redundancy point in the regions occupied by the vehicles or their detectable regions D, the temporary driving schedule creating part 25 chooses the vehicle yielding the highest average redundancy determined in the above-mentioned steps S110 to S114 (S116).

For the driving schedule of the vehicle having the highest average redundancy, the temporary driving schedule creating part 25 creates such a temporary driving schedule as to bypass the highest redundancy point (S117). Specifically, the temporary driving schedule creating part 25 creates such a driving schedule as to perform deceleration when the highest redundancy point is located in front of the vehicle having the highest average redundancy, whereas it creates such a driving schedule as to change the lane to the right side when the highest redundancy point is located on the left side of the vehicle having the highest average redundancy. In the case of FIG. 4, for example, the leading vehicle VF performs acceleration A, whereas the trailing vehicle VB performs deceleration S.

The driving schedule creating part 26 conducts a safety evaluation of the temporary driving schedule created by the temporary driving schedule creating part 25, and discards the temporary driving schedule without performing the subsequent steps S119 and S120 when the evaluated value fails to satisfy a safety standard (S118).

Assuming the case where the vehicles are driven by the temporary driving schedule, the driving schedule creating part 26 performs the processes of the above-mentioned steps S106 to S109, so as to compute a temporary time-averaged redundancy for the temporary driving schedule (S119). When the temporary time-averaged redundancy is lower than the time-averaged redundancy (S120), the driving schedule creating part 26 employs the temporary time-averaged redundancy (S121).

The temporary driving schedule creating part 25 and driving schedule creating part 26 execute the above-mentioned steps S117 to S121 in the leading vehicle VF, following vehicle VM, and trailing vehicle VB successively in descending order of their average redundancies (S122). The temporary driving schedule creating part 25 and driving schedule creating part 26 repeat the processes of the above-mentioned steps S116 to S122 in all the regions of the detection/estimation object map successively in descending order of their redundancies (S123).

Processing Procedure 2: Actions at the Time of Creating a New Undetectable Closed Region Actions at the time of creating a new undetectable closed region in the driving schedule creating device in accordance with this embodiment will now be explained.

Figure 5:
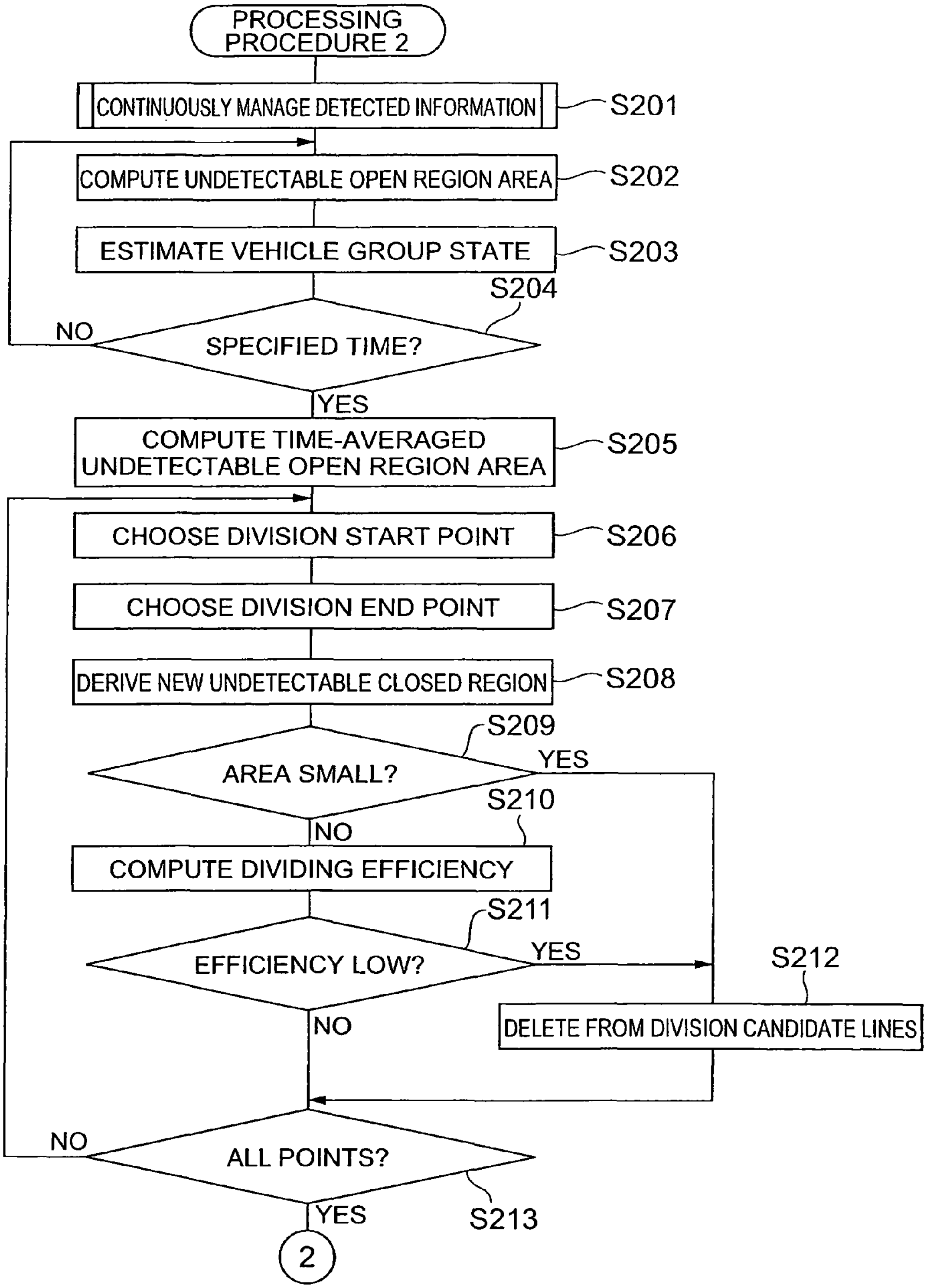
FIG. 5 is a flowchart showing actions at the time of creating a new undetectable closed region by the driving schedule creating apparatus in accordance with the embodiment.
Figure 6:
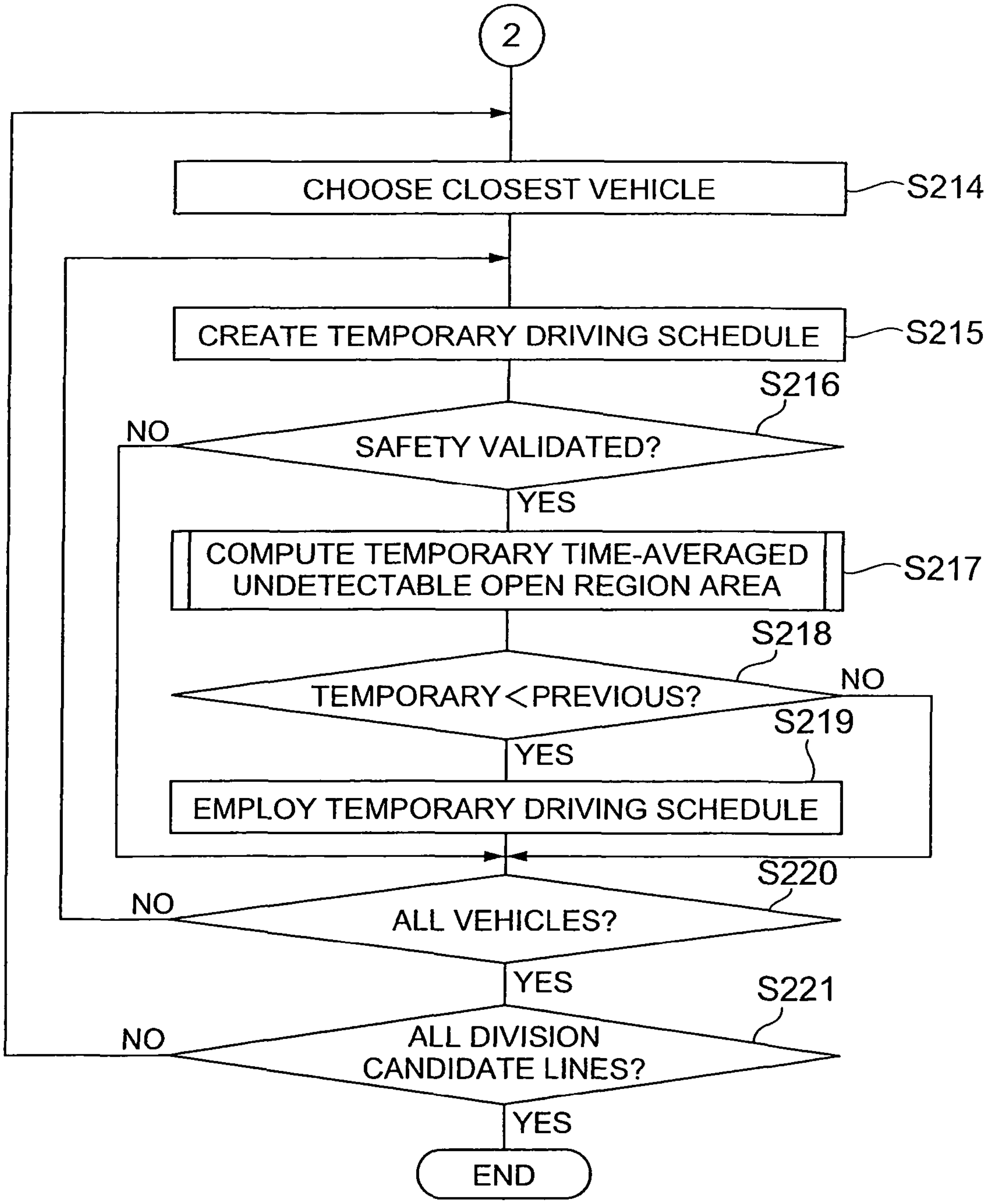
FIG. 6 is a flowchart showing actions at the time of creating a new undetectable closed region by the driving schedule creating apparatus in accordance with the embodiment.
Figure 7:
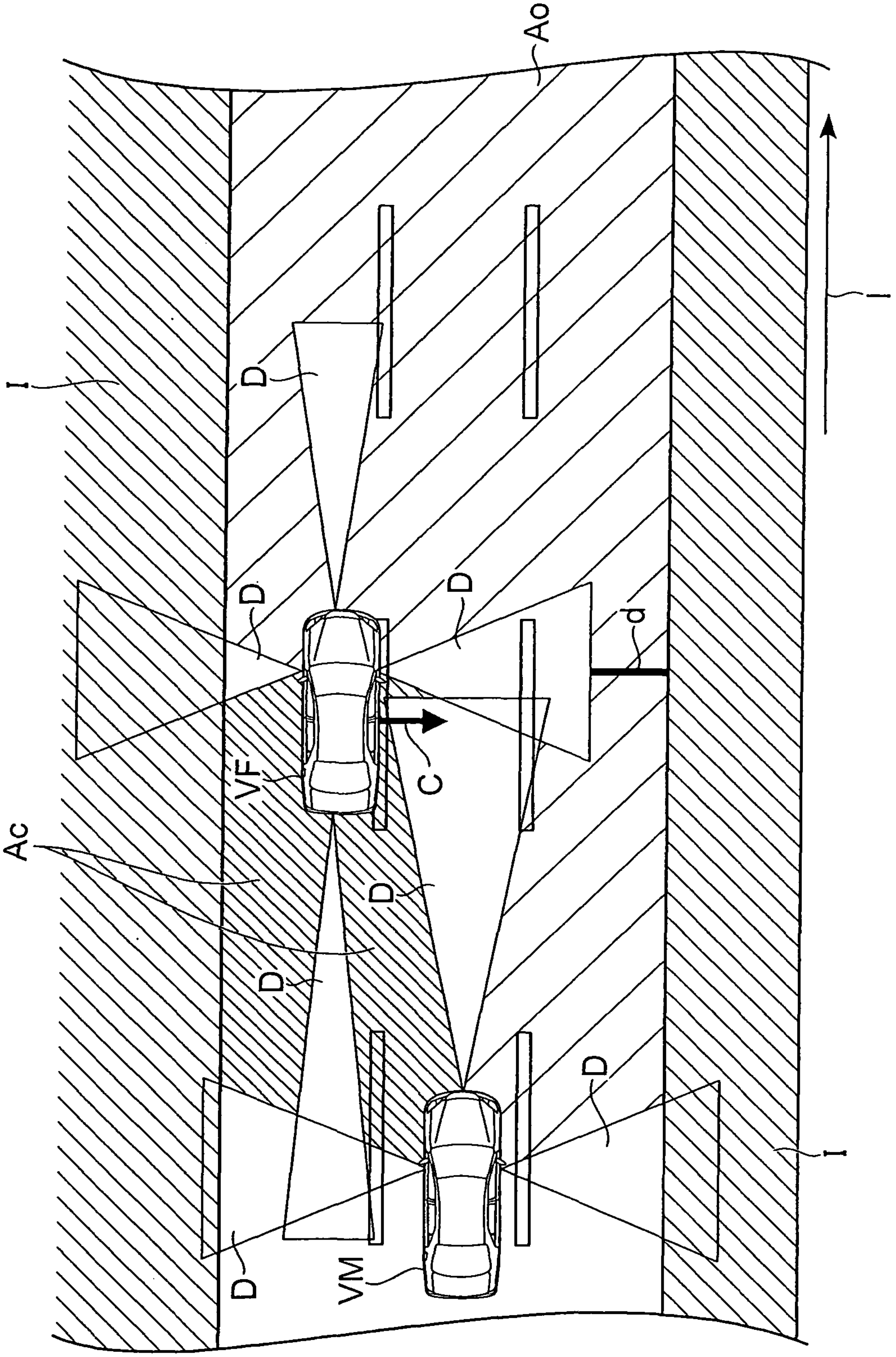
FIG. 7 is a plan view showing actions at the time of creating the new undetectable closed region by the driving schedule creating apparatus in accordance with the embodiment.

FIGS. 5 and 6 are flowcharts showing the actions at the time of creating the new undetectable closed region by the driving schedule creating device in accordance with this embodiment. FIG. 7 is a plan view showing the actions at the time of creating the new undetectable closed region by the driving schedule creating device in accordance with this embodiment. As shown in FIG. 7, a leading vehicle VF and a following vehicle VM, each mounted with the driving schedule creating device 1 in accordance with this embodiment comprising the perimeter monitoring sensor 10 and the like, run as a vehicle group along an advancing direction 1 on a road having undrivable regions I where the vehicles are undrivable on both sides. As a representative of the vehicle group, one of the driving schedule creating devices 1 mounted in the leading vehicle VF and following vehicle VM creates the following driving schedule according to the detection results of the perimeter monitoring sensor 10 of the other vehicle and the like.

As a prerequisite, as shown in FIG. 5, information detected by the perimeter monitoring sensors 10 of the leading vehicle VF and following vehicle VM is continuously managed by a process similar to that of step S101 in the above-mentioned processing procedure 1 (S201). In the example of FIG. 7, an undetectable closed region Ac, which is a region defined by any of the respective detectable regions D of the perimeter monitoring sensors 10 and undrivable regions I, is formed in the rear of the leading vehicle VF and on the front left side of the following vehicle VM in a detection/estimation object map. The object estimating part 24 of the ECU 20 continuously manages incomings and outgoings of vehicles with respect to the undetectable closed region Ac, whereby the number of vehicles within the undetectable closed region, which cannot directly be detected by the perimeter monitoring sensors 10, is continuously estimated. On the other hand, an undetectable open region Ao undefined by any of the respective detectable regions D of the perimeter monitoring sensors 10 and undrivable regions I is formed on the front and right sides of the leading vehicle VF and on the front right side of the following vehicle VM in the detection/estimation object map.

According to the following procedure, the time-averaged undetectable open region area is determined. The open/closed region acquiring part 23 determines an undetectable open region area which is the area of the undetectable region Ao at the moment (S202). According to the driving schedules created by the respective driving schedule creating part 26 of the driving schedule creating devices 1 in the leading vehicle VF and following vehicle VM, the respective actions of the vehicles detected by the perimeter monitoring sensors 10, and the like, the open/closed region acquiring part 23 estimates the state of each of the vehicles constituting the vehicle group after the lapse of a unit time (e.g., 1 sec) (S203).

Up to a specified time (e.g., 10 sec), the open/closed region acquiring part 23 determines the undetectable open region area at intervals of a unit time for the estimated state of each vehicle after the lapse of the unit time as mentioned above (S202 to S204). The open/closed region acquiring part 23 determines an average of all the undetectable open region areas on the time axis up to the specified time, thereby yielding a time-averaged undetectable region area (S205).

The open/closed region acquiring part 23 repeats the following processes along the boundary lines of the undetectable open area Ac, thereby computing a division candidate line and its dividing efficiency. The open/closed region acquiring part 23 chooses one of end points of the boundary lines of the undetectable open region Ac as a division start point (S206). Similarly, the open/closed region acquiring part 23 chooses one of end points of the boundary lines of the undetectable open region Ac as a division end point (S207). The open/closed region acquiring part 23 connects the division start point and division end point to each other, so as to form a division candidate line d, and derives a region defined by any of the detectable regions D, undrivable regions I, and division candidate line d as a new undetectable closed region (S208).

When the undetectable closed region has an area not greater than a specified value (e.g., 10 $m^2$ or less), the open/closed region acquiring part 23 considers it ineligible for the division candidate line d and does not perform the following steps S210 and S211 (S209). The open/closed region acquiring part 23 divides the area of the new undetectable closed region by the length of the division candidate line d formed in step S208, and defines its result as the dividing efficiency (S210). When the dividing efficiency is less than a specified value (e.g., 1) (S211), the open/closed region acquiring part 23 considers it ineligible for the division candidate line d (S212). For all the points on the boundary lines of the undetectable open area Ac, the open/closed region acquiring part 23 repeats the above-mentioned processes of steps S206 to S212 in a double loop with respect to all the combinations of division start and end points (S213).

The temporary driving schedule creating part 25 and driving schedule creating part 26 perform the following processes for all the division candidate lines d successively in descending order of their dividing efficiencies, thereby creating such a driving schedule as to be able to divide the undetectable open region Ao efficiently and form a new undetectable closed region.

As shown in FIG. 6, in the leading vehicle VF and following vehicle VM, the temporary driving schedule creating part 25 chooses the vehicle located closest to the division candidate line d (S214). The temporary driving schedule creating part 25 creates such a temporary driving schedule as to be able to divide the undetectable open region Ao and form a new undetectable closed area (S215). Specifically, for example, the temporary driving schedule creating part 25 creates such a temporary driving schedule as to perform deceleration when the division candidate line d is located in the rear of the vehicle, whereas it creates such a temporary driving schedule as to change the lane to the left side when the division candidate line d is located on the left side of the vehicle. Since the division candidate line d is located on the right side of the leading vehicle VF in the example of FIG. 7, the temporary driving schedule creating part 25 creates such a temporary driving schedule as to cause the leading vehicle VF to change the lane to the right side C.

The driving schedule creating part 26 conducts a safety evaluation of the temporary driving schedule created by the temporary driving schedule creating part 25, and discards the temporary driving schedule without performing the subsequent steps S217 to S219 when the evaluated value fails to satisfy a safety standard (S216).

Assuming the case where the vehicles are driven by the temporary driving schedule, the driving schedule creating part 26 performs the processes of the above-mentioned steps S202 to S205, so as to compute a temporary time-averaged undetectable open region area for the temporary driving schedule (S217). When the temporary time-averaged undetectable open region area is smaller than the time-averaged undetectable open region area (S218), the driving schedule creating part 26 employs the temporary driving schedule (S219).

The temporary driving schedule creating part 25 and driving schedule creating part 26 execute the above-mentioned steps S215 to S219 in the leading vehicle VF and following vehicle VM successively in ascending order of their distance to the division candidate line d (S220). The temporary driving schedule creating part 25 and driving schedule creating part 26 repeat the processes of the above-mentioned steps S214 to S220 in all the division candidate lines d successively in descending order of their dividing efficiencies (S221).

Processing Procedure 3: Actions for Reducing Errors in Estimating Objects Existing in an Undetectable Closed Region Actions for reducing errors in estimating objects existing in an undetectable closed region in the driving schedule creating device in accordance with this embodiment will now be explained.

Figure 8:
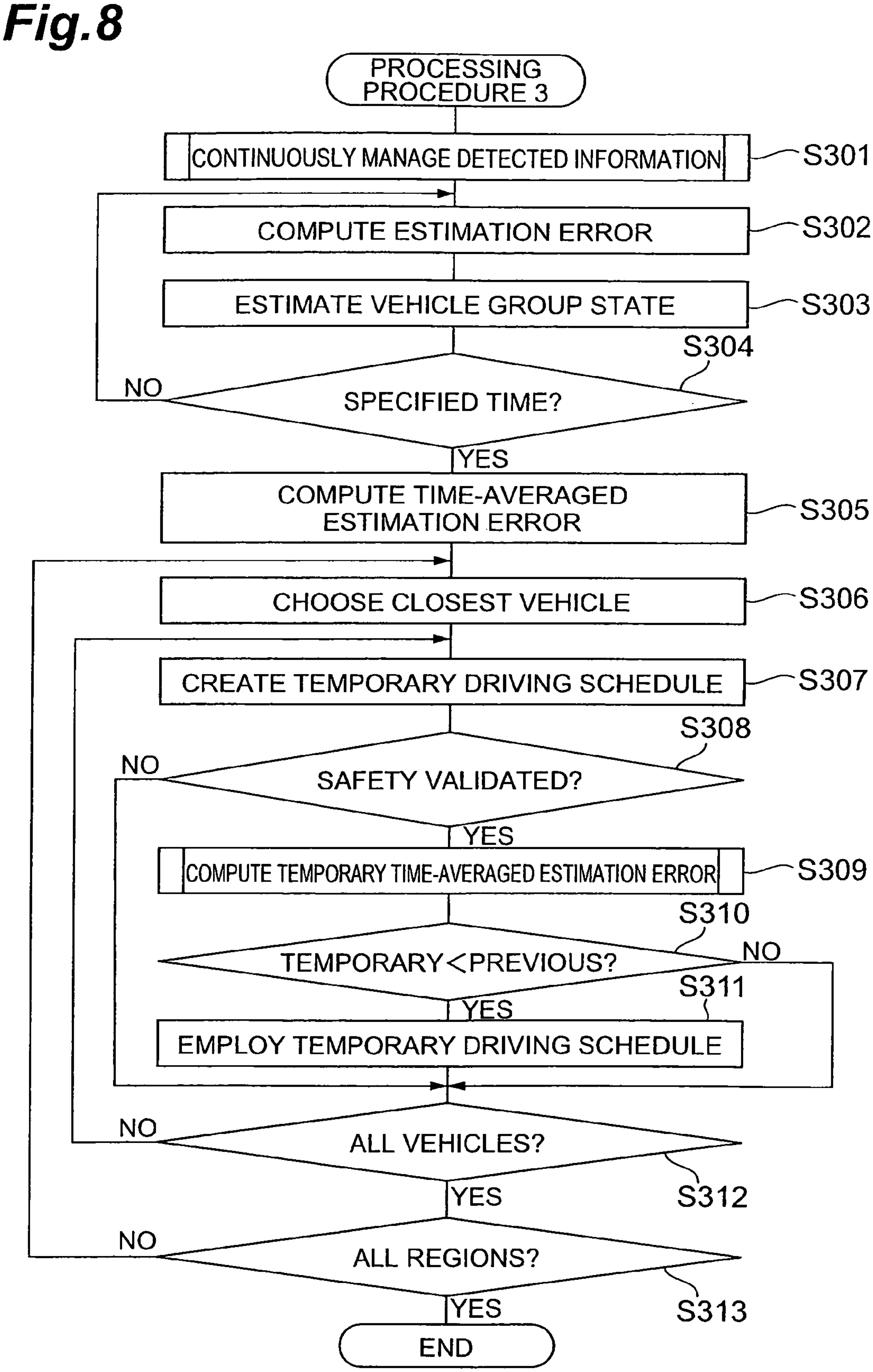
FIG. 8 is a flowchart showing actions for reducing the estimation error for objects existing in an undetectable closed region by the driving schedule creating apparatus in accordance with the embodiment.
Figure 9:
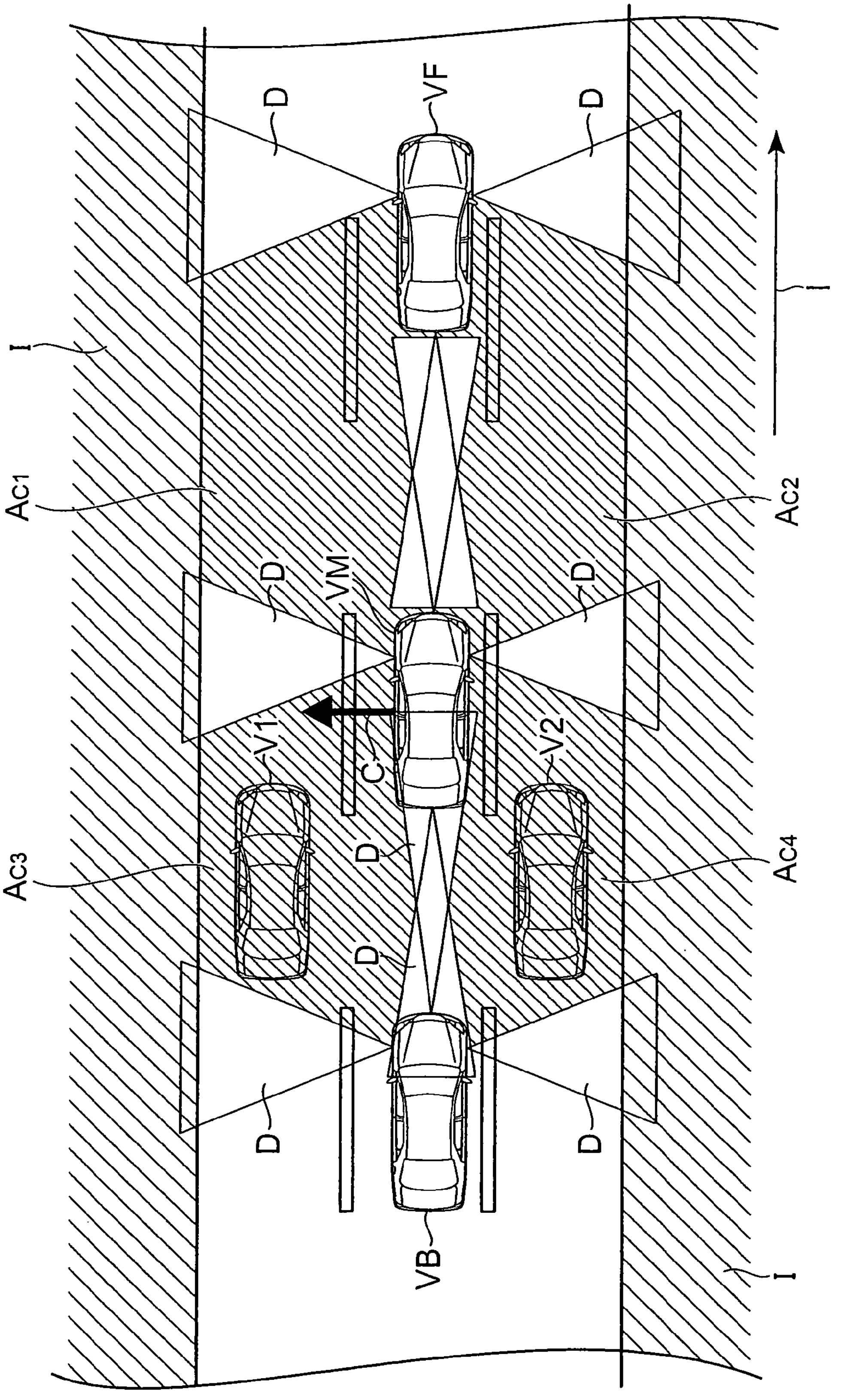
FIG. 9 is a plan view showing actions for reducing the estimation error for objects existing in the undetectable closed region by the driving schedule creating apparatus in accordance with the embodiment.

FIG. 8 is a flowchart showing the actions for reducing errors in estimating objects existing in the undetectable closed region by the driving schedule creating device in accordance with this embodiment. FIG. 9 is a plan view showing the actions for reducing errors in estimating objects existing in the undetectable closed region by the driving schedule creating device in accordance with this embodiment. As shown in FIG. 9, a leading vehicle VF, a following vehicle VM, and a trailing vehicle VB, each mounted with the driving schedule creating device 1 in accordance with this embodiment comprising the perimeter monitoring sensor 10 and the like, run as a vehicle group along an advancing direction 1 on a road having undrivable regions I where the vehicles are undrivable on both sides. As a representative of the vehicle group, one of the driving schedule creating devices 1 mounted in the leading vehicle VF, following vehicle VM, and trailing vehicle VB creates the following driving schedule according to the detection results of the perimeter monitoring sensors 10 of the other vehicles and the like.

As a prerequisite, as shown in FIG. 8, information detected by the perimeter monitoring sensors 10 of the leading vehicle VF and following vehicle VM is continuously managed by a process similar to that of step S101 in the above-mentioned processing procedure 1 (S301). In the example of FIG. 9, in a detection/estimation object map, undetectable closed regions Ac1, Ac2 are formed between the leading vehicle VF and following vehicle VM, while undetectable closed regions Ac3, Ac4 are formed between the following vehicle VM and trailing vehicle VB. The object estimating part 24 of the ECU 20 continuously manages incomings and outgoings of vehicles with respect to the undetectable closed regions Ac1 to Ac4, whereby the number of vehicles within the undetectable closed regions, which cannot directly be detected by the perimeter monitoring sensors 10, is continuously estimated.

According to the following procedure, a time-averaged undetectable closed region estimation error is determined. The object estimating part 24 determines an undetectable closed region estimation error which is an estimation error for obstacles existing within the undetectable closed regions Ac1 to Ac4 at the moment (S302). Specifically, the object estimating part 24 determines an average of estimation errors (differences between estimated maximum and minimum numbers of existing vehicles) in all the undetectable closed regions Ac1 to Ac4.

According to the driving schedules created by the respective driving schedule creating parts 26 of the driving schedule creating devices 1 in the leading vehicle VF, following vehicle VM, and trailing vehicle VB, the respective actions of the vehicles detected by the perimeter monitoring sensors 10, and the like, the object estimating part 24 estimates the state of each of the vehicles constituting the vehicle group after the lapse of a unit time (e.g., 1 sec) (S303).

Up to a specified time (e.g., 10 sec), the object estimating part 24 determines the undetectable closed region estimation error at intervals of a unit time for the estimated state of each vehicle after the lapse of the unit time as mentioned above (S302 to S304). The object estimating part 24 determines an average of all the undetectable closed region estimation errors on the time axis up to the specified time, thereby yielding a time-averaged undetectable closed region estimation error (S305).

The temporary driving schedule creating part 25 and driving schedule creating part 26 perform the following processes for all the undetectable closed regions Ac1 to Ac4 successively in descending order of their estimation errors, thereby creating such a driving schedule as to be able to minimize the estimation errors.

For the undetectable closed region yielding the largest estimation error in the undetectable closed regions Ac1 to Ac4, the temporary driving schedule creating part 25 chooses the vehicle located closest to this undetectable closed region in the leading vehicle VF, following vehicle VM, and trailing vehicle VB (S306). In the example of FIG. 9, the undetectable closed region Ac1 becomes the undetectable closed region yielding the largest estimation error. The temporary driving schedule creating part 25 creates such a temporary driving schedule as to be able to reduce the estimation error (S307). Specifically, for example, the temporary driving schedule creating part 25 creates such a temporary driving schedule as to perform deceleration when the undetectable closed region exists in the rear of the vehicle, whereas it creates such a temporary driving schedule as to change the lane to the left side when the undetectable closed region exists on the left side of the vehicle. Since the undetectable closed region Ac1 exists on the left side of the following vehicle VM in the example of FIG. 9, the temporary driving schedule creating part 25 creates such a temporary driving schedule as to cause the following vehicle VM to change the lane to the left side C.

The driving schedule creating part 26 conducts a safety evaluation of the temporary driving schedule created by the temporary driving schedule creating part 25, and discards the temporary driving schedule without performing the subsequent steps S309 to S311 when the evaluated value fails to satisfy a safety standard (S308).

Assuming the case where the vehicles are driven by the temporary driving schedule, the driving schedule creating part 26 performs the processes of the above-mentioned steps S302 to S305, so as to compute a temporary time-averaged undetectable closed region estimation error for the temporary driving schedule (S309). When the temporary time-averaged undetectable closed region estimation error is smaller than the time-averaged undetectable closed region estimation error (S310), the driving schedule creating part 26 employs the temporary driving schedule (S311).

The temporary driving schedule creating part 25 and driving schedule creating part 26 execute the above-mentioned steps S307 to S311 in the leading vehicle VF, following vehicle VM, and trailing vehicle VB successively in ascending order of their distances to the undetectable closed region (S312). The temporary driving schedule creating part 25 and driving schedule creating part 26 repeat the processes of the above-mentioned steps S306 to S312 in all the undetectable closed regions successively in descending order of their estimation errors (S313).

Processing Procedure 4: Actions for Reducing Errors in Estimating Objects Existing in an Undetectable Closed Region by the Driving Schedule Creating Device in Accordance with the Embodiment After Passing an Infrastructure Sensor Actions for reducing errors in estimating objects in the driving schedule creating device in accordance with the embodiment after passing an infrastructure sensor will now be explained.

Figure 10:
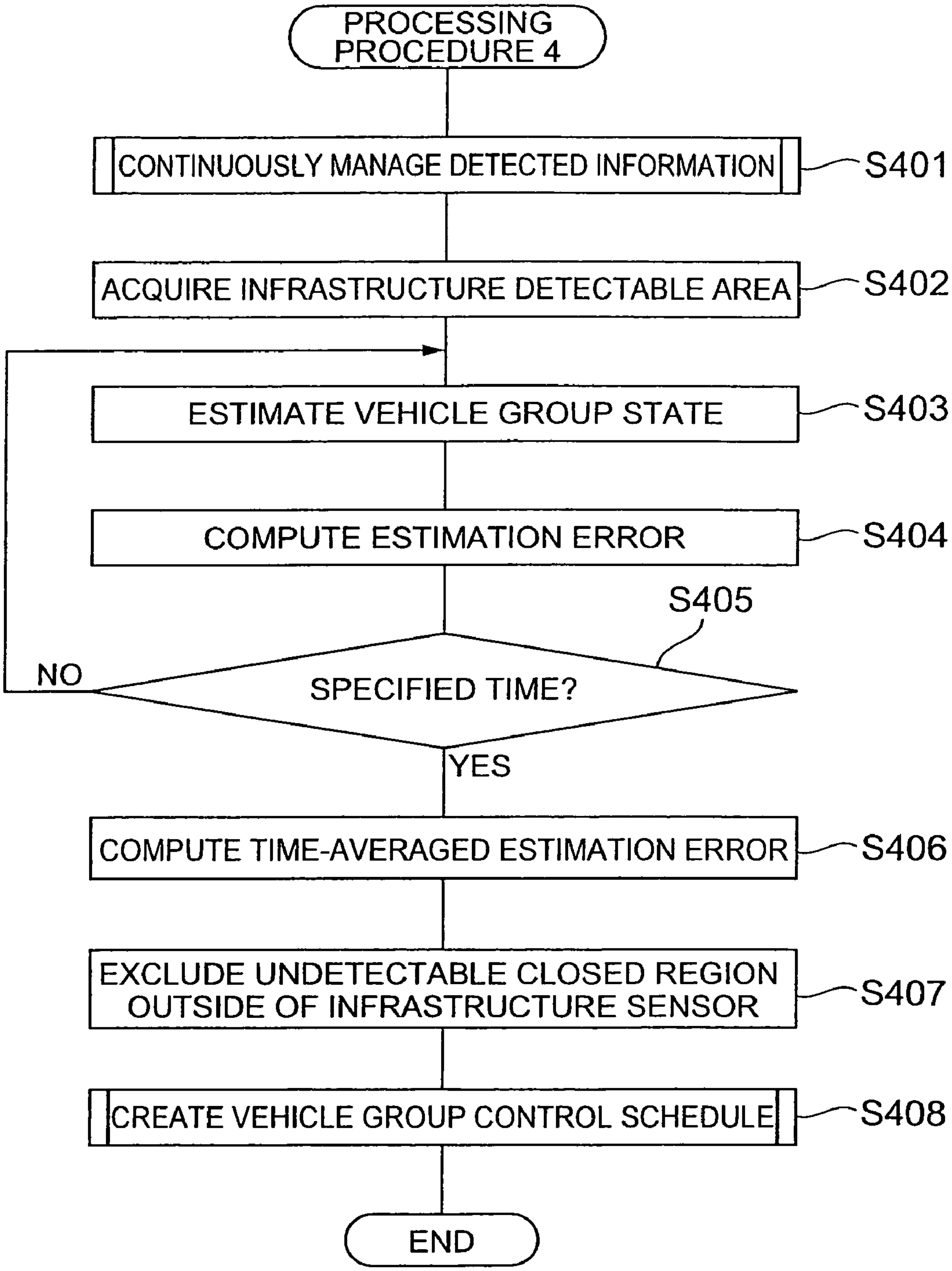
FIG. 10 is a flowchart showing actions for reducing the estimation error for objects existing in an undetectable closed region by the driving schedule creating apparatus in accordance with the embodiment after passing an infrastructure sensor.
Figure 11:
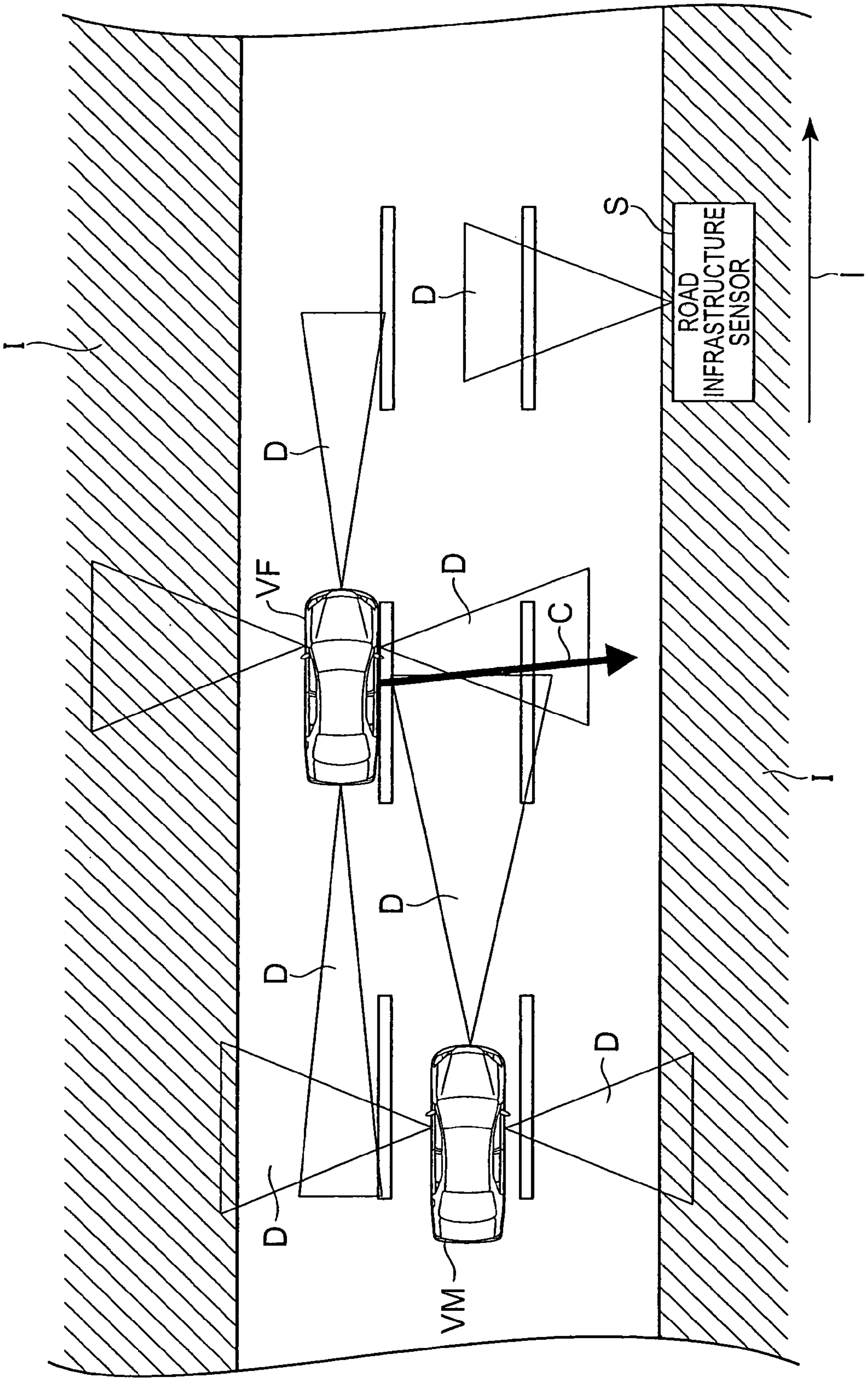
FIG. 11 is a plan view showing actions for reducing the estimation error for objects existing in the undetectable closed region by the driving schedule creating apparatus in accordance with the embodiment after passing the infrastructure sensor.

FIG. 10 is a flowchart showing the actions for reducing errors in estimating objects existing in the undetectable closed region by the driving schedule creating device in accordance with this embodiment after passing the infrastructure sensor. FIG. 11 is a plan view showing the actions for reducing errors in estimating objects existing in the undetectable closed region by the driving schedule creating device in accordance with this embodiment after passing the infrastructure sensor. As shown in FIG. 11, a leading vehicle VF and a following vehicle VM, each mounted with the driving schedule creating device 1 in accordance with this embodiment comprising the perimeter monitoring sensor 10 and the like, run as a vehicle group along an advancing direction 1 on a road having undrivable regions I where the vehicles are undrivable on both sides. As a representative of the vehicle group, one of the driving schedule creating devices 1 mounted in the leading vehicle VF and following vehicle VM creates the following driving schedule according to the detection results of the perimeter monitoring sensor 10 of the other vehicle and the like.

As a prerequisite, as shown in FIG. 11, information detected by the perimeter monitoring sensors 10 of the leading vehicle VF and following vehicle VM is continuously managed by a process similar to that of step S101 in the above-mentioned processing procedure 1 (S401). When an undetectable closed region defined by any of the detectable regions of the perimeter monitoring sensors 10 of the leading vehicle VF and following vehicle VM and undrivable regions I is formed, the object estimating part 24 of the ECU 20 continuously manages incomings and outgoings of vehicles with respect to the undetectable closed region, whereby the number of vehicles within the undetectable closed region, which cannot directly be detected by the perimeter monitoring sensors 10, is continuously estimated. In the example of FIG. 11, the vehicle group constituted by the leading vehicle VF and following vehicle VM is passing the vicinity of a road infrastructure sensor S.

The detectable region acquiring part 21 acquires a detectable region (road sensor detectable region) D of the road infrastructure sensor S from the infrastructure sensor S by the communication device 14 (S402). Alternatively, the detectable region acquiring part 21 acquires the detectable region D of the road infrastructure sensor S from the navigation system 11.

According to the following procedure, a time-averaged undetectable closed region estimation error after passing the road infrastructure sensor S is determined. According to the driving schedules created by the respective driving schedule creating parts 26 of the driving schedule creating devices 1 in the leading vehicle VF and following vehicle VM, the respective actions of the vehicles detected by the perimeter monitoring sensors 10, and the like, the object estimating part 24 estimates the state of each of the vehicles constituting the vehicle group immediately after the leading vehicle VF of the vehicle group passes the detectable region D of the road infrastructure sensor S (S403).

When an undetectable closed region defined by any of the detectable regions D of the perimeter monitoring sensors 10 of the leading vehicle VF and following vehicle VM, the detectable region D of the road infrastructure sensor, and the undrivable regions I is formed at a time immediately after the leading vehicle VF of the vehicle group passes the detectable region D of the road infrastructure sensor S, the object estimating part 24 determines an undetectable closed region estimation error which is an estimation error of obstacles existing within the undetectable region (S404). Specifically, the object estimating part 24 determines an average of estimation errors (differences between estimated maximum and minimum numbers of existing vehicles) in all the undetectable closed regions.

Up to a specified time (e.g., 10 sec), the object estimating part 24 determines the undetectable closed region estimation error at intervals of a unit time for the estimated state of each vehicle after the lapse of the unit time as mentioned above (S403 to S405). The object estimating part 24 determines an average of all the undetectable closed region estimation errors on the time axis up to the specified time, thereby yielding a time-averaged undetectable closed region estimation error (S406).

The temporary driving schedule creating part 25 and driving schedule creating part 26 determine whether each of all the undetectable closed regions formed after the leading vehicle VF of the vehicle group passes the detectable region D of the road infrastructure sensor S overlaps the detectable region D of the road infrastructure sensor S or not, whereby the undetectable regions on the outside of the detectable region D of the road infrastructure sensor S are considered ineligible for the following processes (S407).

For each of all the undetectable closed regions remaining after the process of step S407, the temporary driving schedule creating part 25 and driving schedule creating part 26 create such a driving schedule as to be able to minimize the estimation errors after passing the road infrastructure sensor S as in the steps S306 to S313 in the processing procedure 3 (S408). The computing of the time-averaged undetectable closed region estimation error in this case is performed by the above-mentioned processes of steps S403 to S405. In the example of FIG. 11, for creating an undetectable closed region which makes estimation errors smaller in the right direction toward the road infrastructure sensor S, the driving schedule creating part 26 creates such a driving schedule as to cause the leading vehicle VF to change the lane to the right side.

In this embodiment, the detectable region acquiring part 21 acquires the respective detectable regions D of the perimeter monitoring sensors 10 mounted in a plurality of vehicles, while the driving schedule creating part 26 creates respective driving schedules of the plurality of vehicles according to the respective detectable regions D of the perimeter monitoring sensors 10 mounted in the plurality of vehicles acquired by the detectable region acquiring part 21, whereby the vehicles mounted with the perimeter monitoring sensors 10 run according to their detectable regions D, thus making it possible to improve the accuracy in estimating the existence of obstacles.

The temporary driving schedule creating part 25 creates respective temporary driving schedules of the plurality of vehicles, while the driving schedule creating part 26 evaluates the temporary driving schedules created by the temporary driving schedule creating part 25 according to the respective detectable regions D of the perimeter monitoring sensors 10 mounted in the plurality of vehicles acquired by the detectable region acquiring part 21 and employs the temporary driving schedules whose evaluation results satisfy predetermined standards as driving schedules, whereby the driving schedule creating part 26 employs favorable driving schedules satisfying the evaluation standards corresponding to the detectable regions D, thus making it possible to further improve the accuracy in estimating the existence of obstacles.

Further, since the driving schedule creating part 26 employs a temporary driving schedule which enlarges any of the detectable regions D and undetectable closed regions as a driving schedule according to information from the detectable regions D and undetectable closed regions, it becomes more possible for the perimeter monitoring sensors 10 to detect obstacles directly or indirectly, whereby the accuracy in estimating the existence of obstacles can be improved.

On the other hand, the redundancy computing part 22 computes redundancies between the respective detectable regions D of the perimeter monitoring sensors 10 mounted in a plurality of vehicles, while the driving schedule creating part 26 creates respective driving schedules of the plurality of vehicles according to the redundancies between the detectable regions D computed by the redundancy computing part 22, whereby the vehicles mounted with the perimeter monitoring sensors 10 can run according to the redundancies between the detectable regions D.

In particular, the driving schedule creating part 26 creates such a driving schedule as to lower the redundancies between the detectable regions D computed by the redundancy computing part 22, and thus can create a driving schedule which reduces parts where the detectable regions D of the perimeter monitoring sensors 10 overlap each other, thereby enlarging areas where obstacles can directly be detected by the perimeter monitoring sensors 10 of the vehicles.

On the other hand, the open/closed region acquiring part 23 acquires an undetectable open region Ao undefined by any of the respective detectable regions D of the perimeter monitoring sensors 10 mounted in a plurality of vehicles and undrivable regions I where the vehicles are undrivable, while the driving schedule creating part 26 creates such a driving schedule as to turn at least a part of the undetectable open region Ao into an undetectable closed region Ac defined by any of the respective detectable regions D of the perimeter monitoring sensors 10 mounted in a plurality of vehicles and undrivable regions I where the vehicles are undrivable, thus making it possible to create a driving schedule which can reduce the undetectable open region Ao where the existence of obstacles cannot be estimated, so as to turn it into the undetectable closed region Ac where the existence of obstacles can be estimated, and enlarge areas where the existence of obstacles can be estimated.

The object estimating part 24 estimates obstacles existing within the undetectable closed region Ac defined by any of the respective detectable regions D of the perimeter monitoring sensors 10 mounted in a plurality of vehicles and undrivable regions I where the vehicles are undrivable and acquires estimation errors in the estimation, while the driving schedule creating part 26 creates respective driving schedules of the plurality of vehicles according to the estimation errors acquired by the object estimating part 24, whereby driving schedules taking account of the estimation errors in the existence of obstacles can be created.

In particular, the driving schedule creating part 26 creates such a driving schedule as to reduce the estimation errors acquired by the object estimating part 24, and thus can create a driving schedule taking account of the errors in estimating the existence of obstacles by the perimeter monitoring sensors 10, whereby the accuracy in estimating the existence of obstacles can be improved.

On the other hand, the detectable region acquiring part 21 acquires the detectable region D of the road infrastructure sensor S for detecting obstacles existing on the road where the vehicles run, while the driving schedule creating part 26 creates respective driving schedules of a plurality of vehicles according to the detectable region D acquired by the detectable region acquiring part 21, whereby driving schedules can be created in consideration of the detectable region D of the road infrastructure sensor S as well.

In particular, the object estimating part 24 estimates obstacles existing within the undetectable closed region defined by any of the respective detectable regions D of the perimeter monitoring sensors 10 mounted in a plurality of vehicles, the detectable region D of the road infrastructure sensor S, and the undrivable regions I where the vehicles are undrivable and acquires estimation errors in the estimation, while the driving schedule creating part 26 creates such driving schedules as to reduce the estimation errors acquired by the object estimating part 24, thus making it possible to create driving schedules in consideration of the estimation errors in the existence of obstacles by the road infrastructure sensors S and improve the accuracy in estimating the existence of obstacles.

Further, this embodiment creates driving schedules in vehicles successively in descending order of redundancies between the detectable regions D and the estimation errors in regions where they belong, such as to evade these circumstances, thereby successively creating driving schedules which evade these circumstances in descending order of redundancies between the detectable regions D and the estimation errors in the regions, thus making it possible to efficiently create driving schedules for improving the accuracy in estimating the existence of obstacles and cause the vehicles actually forming the vehicle group to execute them.

In addition, since each of the vehicles is mounted with the driving schedule creating device 1 in accordance with this embodiment, the vehicles can run while forming a vehicle group by driving schedules which can mutually improve the accuracy in detecting obstacles such as vehicles in this embodiment. Therefore, the driving schedule creating device 1 in accordance with this embodiment can enhance a motivation for vehicles to run in a vehicle group in order to improve safety as compared with a device which simply creates their respective driving schedules.

While an embodiment of the present invention is explained in the foregoing, the present invention is not limited thereto but can be modified in various ways. For example, though the driving schedule creating device creates driving schedules for all the vehicles belonging to a vehicle group, the present invention is not limited thereto, but encompasses and is effective in one in which the driving schedule creating device creates a driving schedule of only one of the vehicles in the vehicle group.

What is claimed is:

1. A driving schedule creating device for creating a driving schedule of a vehicle mounted with an onboard sensor for detecting an obstacle existing thereabout; the device comprising:

an onboard sensor detection region acquiring unit for acquiring onboard sensor detectable regions as detectable regions of respective onboard sensors mounted in a plurality of vehicles;

a driving schedule creating unit for creating the driving schedule of the vehicle according to the respective onboard sensor detectable regions of the onboard sensors mounted in the plurality of vehicles acquired by the onboard sensor detection region acquiring unit; and a temporary driving schedule creating unit for creating a temporary driving schedule of the vehicle;

wherein the driving schedule creating unit evaluates according to the onboard sensor detectable regions of the respective onboard sensors mounted in the vehicles acquired by the onboard sensor detection region acquiring unit the temporary driving schedule created by the temporary driving schedule creating unit and employs the temporary driving schedule whose result of evaluation satisfies a predetermined standard as the driving schedule; and the temporary driving schedule satisfying the standard is a temporary driving schedule by which the onboard sensor detectable region or a region where the existence of an obstacle is estimatable according to information from the onboard sensor detectable region is made greater than that in another temporary driving schedule.

2. A driving schedule creating device according to claim 1, further comprising a redundancy computing unit for computing a redundancy between the respective onboard sensor detectable regions of the onboard sensors mounted in the plurality of vehicles;

wherein the driving schedule creating unit creates the driving schedule of the vehicle according to the redundancy between the onboard sensor detectable regions computed by the redundancy computing unit.

3. A driving schedule creating device according to claim 2, wherein the driving schedule creating unit creates such a driving schedule as to lower the redundancy between the onboard sensor detectable regions computed by the redundancy computing unit.

4. A driving schedule creating device according to claim 1, further comprising an open region acquiring unit for acquiring an open region undefined by any of the respective onboard sensor detectable regions of the onboard sensors mounted in the plurality of vehicles and undrivable regions where the vehicles are undrivable;

wherein the driving schedule creating unit creates such a driving schedule that at least a part of the open region becomes a closed region defined by any of the respective onboard sensor detectable regions of the onboard sensors mounted in the plurality of vehicles and undrivable regions where the vehicles are undrivable.

5. A driving schedule creating device according to claim 1, further comprising:

an onboard sensor utilization estimating unit for estimating an obstacle existing in a closed region defined by any of the respective onboard sensor detectable regions of the onboard sensors mounted in the plurality of vehicles and undrivable regions where the vehicles are undrivable; and an onboard sensor utilization estimation error acquiring unit for acquiring an estimation error in the estimation effected by the onboard sensor utilization estimating unit;

wherein the driving schedule creating unit creates the driving schedule of the vehicle according to the estimation error acquired by the onboard sensor utilization estimation error acquiring unit.

6. A driving schedule creating device according to claim 5, wherein the driving schedule creating unit creates such a driving schedule as to reduce the estimation error acquired by the onboard sensor utilization estimation error acquiring unit.

7. A driving schedule creating device according to claim 1, further comprising a road sensor detection region acquiring unit for acquiring a road sensor detectable region as a detectable region of a road sensor for detecting an obstacle existing on a road where the vehicle runs;

wherein the driving schedule creating unit creates the driving schedule of the vehicle according to the road sensor detectable region acquired by the road sensor detection region acquiring unit.

8. A driving schedule creating device according to claim 7, further comprising:

a road sensor utilization estimating unit for estimating an obstacle existing in a closed region defined by any of the respective onboard sensor detectable regions of the onboard sensors mounted in the plurality of vehicles, the detectable region of the road sensor, and undrivable regions where the vehicles are undrivable; and a road sensor utilization estimation error acquiring unit for acquiring an estimation error in the estimation effected by the road sensor utilization estimating unit;

wherein the driving schedule creating unit creates such a driving schedule as to reduce the estimation error acquired by the road sensor utilization estimation error acquiring unit.

* * * * *